May 3, 1927.

J. A. ELIAS

PAPER FASTENER

Original Filed Nov. 16, 1923

Re. 16,610

INVENTOR
JUSTIN A. ELIAS.

BY
William J. Jackson
ATTORNEY

Reissued May 3, 1927. Re. 16,610

UNITED STATES PATENT OFFICE.

JUSTIN A. ELIAS, OF PHILADELPHIA, PENNSYLVANIA, ASSIGNOR TO FRED J. KLINE, OF LONG ISLAND CITY, NEW YORK.

PAPER FASTENER.

Original application filed November 16, 1923, Serial No. 675,048. Renewed December 19, 1925. Original No. 1,572,192, dated February 9, 1926. Application for reissue filed March 3, 1927. Serial No. 172,523.

This invention, generally stated relates to a binder or fastener for sheets of paper, drawings, tracings, blue prints, and the like, and has more particular relation to a locking arrangement therefor.

Engineers, draughtsmen, architects, contractors and others, at present experience considerable difficulty with paper fasteners for several reasons, chief among which mention may be made of the following:—With certain types of fasteners it has been found that the weight of a plurality of sheets has the tendency to displace fastener parts which causes the sheets to be insecurely held together. In other types it is necessary to have a device for forming apertures to receive a pair of spaced fastener prongs or tongues. In still other types it is necessary to bend over a multiplicity of lugs or the like before the sheets can be disengaged.

The leading object of the present invention is to overcome the above recited disadvantageous features and provide a paper fastener which may be attached to a series of sheets without punching more than a single aperture; which when in position securely holds the sheets in proper position without regard to weight thereof; and which may be readily opened to permit of removal of one or more sheets. Other and further objects reside in the provision of general details of construction and arrangement and combination of parts for attaining the results sought in said leading object.

The invention consists of the features hereinafter described and finally claimed.

The nature, characteristic features and scope of the invention will be more fully understood from the following description taken in connection with the accompanying drawings forming part hereof and in which:

Figure 1 is a perspective view of a paper fastener embodying the invention about to be fitted into place with respect to a plurality of sheets of paper or the like.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Figure 1:
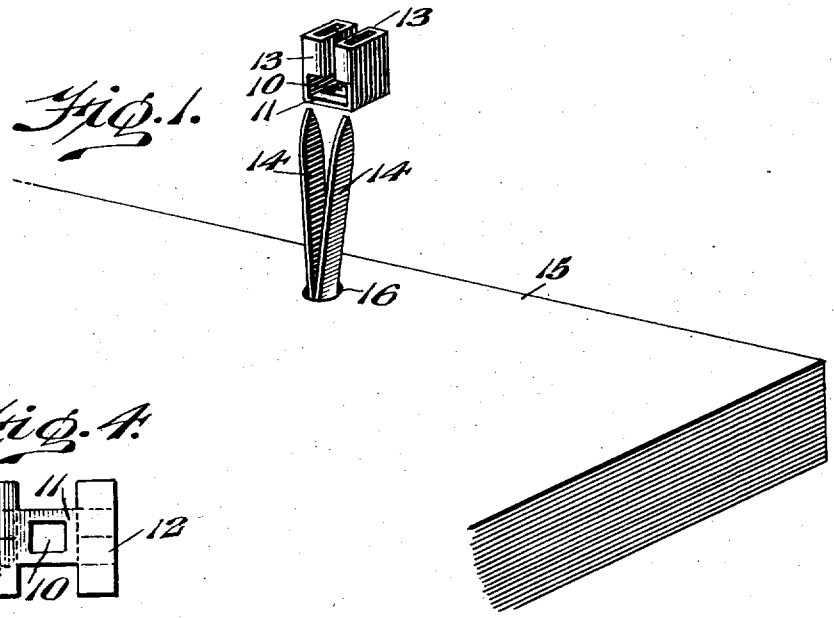
Figure 4:
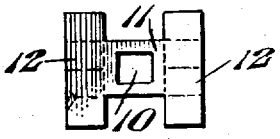
Figure 4 is a view of a fastener part as stamped from a blank.
Figure 2:
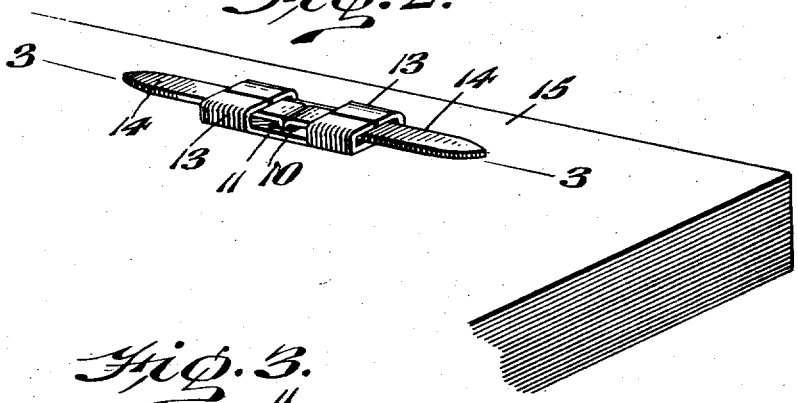
Figure 2 is a similar view showing the fastener in secured position.
Figure 3:
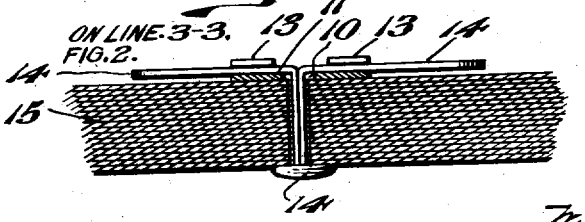
Figure 3 is a fragmentary sectional view taken upon the line 3—3 of Figure 2.

Referring to the drawings in detail and first to Figure 4, there is shown a fastener part as stamped from a blank. In practice, thin pliable metal, as brass is used. The fastener part as stamped is substantially I-shaped with a single, central perforation 10 in the narrow body part 11. The opposed ends 12—12 are of greater width than the body and the outer edges of each end are bent over toward each other so as to meet at a line passing longitudinally through the center of said body. There are thus provided keepers 13 as clearly shown in Figure 1. The body portion is then bent over so that the two keepers are arranged in parallelism. It is in this form that the fastener part is sold to the trade, with or without pin-clips 14, best seen in Figure 3. In practice a plurality of sheets of paper 15, or other desired material, is provided with a single perforation 16 through which is inserted a conventional paper-clip 14, see Figure 1. The apertured body portion of my novel fastener part is then caused to engage over the prongs of said clip and to further engage within the keepers 13, the prongs in practice being sufficiently long to project entirely through the keepers. In this position the fastener part ends together with the prongs of the paper-clip therein are flattened out upon the uppermost sheet as clearly shown in Figs. 2 and 3. Thus the head of the paper-clip in one instance and the overturned or flattened fastener parts in the other instance serves to clamp securely therebetween said sheets. Not only are sheets 15 thus firmly bound in place against accidental displacement, but should it be necessary to remove a sheet or so it is merely necessary to bend upwardly the keepers and lift them from the paper-clip whereupon ready access may be had to sheet or sheets desired. The paper-clips are made in various but standard sizes and the fastener of the invention is made in sizes for use in conjunction therewith.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. A fastener for a material-binding element having projecting prongs, comprising a body portion having angular projections, and means on said projections for receiving the prongs of the element, said projections being adapted to be flattened with prongs.

2. A fastener for a material-binding element having projecting prongs, comprising a flexible body portion adapted to be initially bent to form projections, and means on said projections for engaging the prongs of the element, said projections being adapted to be flattened with prongs.

3. A fastener for a material-binding element having projecting prongs, comprising a substantially U-shaped body portion having means for receiving the prongs of the element and adapted to be flattened with the prongs.

4. A fastener for a material-binding element having projecting prongs, comprising a body portion having means for receiving the prongs, said body portion being adapted to be initially bent to receive the prongs and subsequently flattened with the prongs.

5. A fastener for a material-binding element having projecting prongs, comprising a body portion having apertures for receiving the prongs as they project at an angle to the material to be bound, said body with the prongs being adapted to be subsequently flattened against the material to be bound.

6. A fastener for a material-binding element having projecting prongs, comprising a body portion having projections for cooperating with the prongs and for holding the same, said projections being adapted to be bent flat with the prongs.

7. A fastener for a material-binding element having projecting prongs, comprising a body portion having an aperture for the passage of the prongs of the element and projecting portions for holding the prongs, said projections being adapted to be bent to spread the prongs.

8. A fastener for a material-binding element having projecting prongs, comprising a body portion having substantially parallel projections and an aperture between said projections for the passage of the prongs of the element, and means on said projections for engaging the prongs of the element.

9. A fastener for a material-binding element comprising a body having an opening for the passage of pliable binding prongs, and having projecting keeper portions for holding the prongs and capable of being folded flat with the prongs.

10. A fastener for a material-binding element comprising a body portion having an aperture for the passage of the binding element, and members extending in angular spaced relation from the sides of the aperture, said members having means to receive the projecting ends of said binding element and adapted to be folded with said ends into juxtaposition to the material to be bound.

11. A binding device, comprising a binding element for passage through an opening in material to be bound, and a fastener comprising a body portion having an aperture for the passage of said binding element, and portions adapted to hold the ends of the binding element and to be folded into juxtaposition with the material to be bound.

12. As an article of manufacture, a fastener for sheet binding comprising a body having a single opening for pliable binding tongue penetration, and having parallel keeper portions each of which is adapted to receive a prong of the binding tongue and capable of being folded to flat, opposed position with the prongs therein.

13. A binding device comprising a paper-clip having a pair of pliable prongs for passage through a single opening in sheets to be bound, a fastener the body of which has a single opening for penetration of said prongs, and parallel keepers for said body to receive the projected prong ends, which keepers with the prongs therein are adapted to be folded to flat, opposed position upon the sheets being bound.

14. The method of producing a material-fastener from a blank of flexible material, which consists in forming prong receiving members on opposite sides of the blank, and bending said sides toward each other.

15. The method of producing a material-fastener from a blank of flexible material, which consists in forming apertured keepers at opposite sides thereof, and bending said keepers into spaced relation with each other.

16. The method of producing a material fastener from a blank of flexible material, which consists in making an aperture in the blank, forming receiving means at opposite sides of the aperture, and bending these means toward each other.

17. The method of forming a sheet fastener which consists in taking an I-shaped blank and providing the central part with a single aperture, bending the opposite edges of each end of said body toward a line passing longitudinally through the center of said body to form hollow keepers and finally bending the body at opposite sides of the center to bring said keepers in spaced relation.

18. A fastener for a material binding element having pliable prongs, comprising a body portion having an aperture for receiving the prongs, and keepers formed at opposite sides of the aperture at an angle to the plane of said body portion, said keepers being adapted to receive the prongs and be flattened therewith.

In testimony whereof I have hereunto affixed my signature.

JUSTIN A. ELIAS.